UNITED STATES PATENT OFFICE.

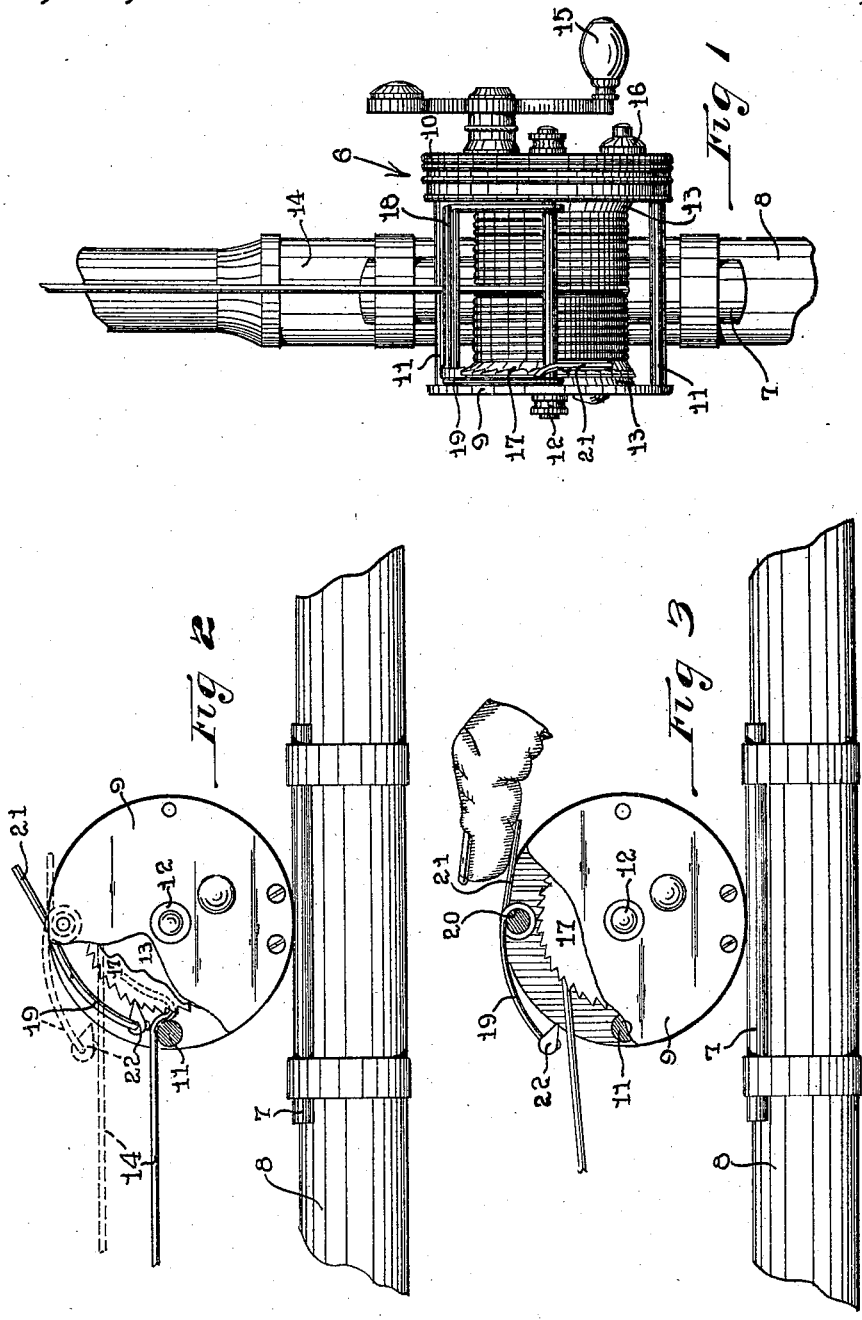

CHARLES HERTENSTEIN, OF CHICAGO, ILLINOIS.

FISHING-LINE REEL.

1,420,428.  Specification of Letters Patent.  Patented June 20, 1922.

Application filed December 27, 1920. Serial No. 433,295.

*To all whom it may concern:*

Be it known that I, CHARLES HERTENSTEIN, a citizen of the United States, and a resident of the city of Chicago, county of Cook, and State of Illinois, have invented certain new and useful Improvements in Fishing-Line Reels, of which the following is a specification.

My invention relates to improvements in fishing line reels, and has for its object the provision of means that will prevent backlashing of the reel and fishing line as the line is cast into the water, and which is simple in structure, inexpensive in manufacture, and efficient in use.

When the ordinary reel is used on a fishing rod and the line is cast out into the water, the momentum imparted to the reel and line continues to rotate the reel and pay out the line after said line has entered the water, and the slack thereby produced in the line usually loosens and entangles it upon the reel causing the same to be wound backwards on the reel. To prevent such loosening and entangling of the line, the fisherman usually places his hand over the reel and presses his thumb on the line while casting out, but this procedure frequently abrades and burns the thumb. It is to obviate the above undesirable incidents that I have invented my automatically acting improvement or back-lashing preventer.

Other objects will appear hereinafter.

The invention consists in the combinations and arrangements of parts hereinafter described and claimed.

The invention will be best understood by reference to the accompanying drawings forming a part of this specification, and in which, Fig. 1 is a plan view of a fishing line reel and rod with my back-lashing preventer mounted thereon in locked position;

Fig. 2 is a side view thereof with parts broken away, showing in dotted lines my device held unlocked on a taut fishing line, and in full lines my device in locked position and the fishing line slack;

Fig. 3 is a view similar to Fig. 2, showing the device held unlocked by means of the thumb.

The drawing illustrates a frame 6 provided with a supporting plate 7 by means of which said frame is mounted on a fishing rod 8. The frame 6 comprises side members 9 and 10, connected by cross bars 11, and a shaft 12 upon which rotates a spool 13 which has the usual fishing line or cord 14 wound thereon. The usual hand lever 15 to wind the line on the spool and a manual operating brake 16 to retard rotation of said spool are provided on the side 10 of the frame.

The foregoing construction is the usual one found in the fishing line reels on the market, and to this construction I apply my anti-backlashing means, comprising a ratchet wheel 17 rigidly attached to one side flange of the spool and a U-shaped pawl member which includes a weighted bight 18 and two legs 19 extending therefrom, the free ends of which have loops 20 encircling the upper cross bar 11, one of which legs continues beyond the loop providing an arm 21, by means of which the pawl 22 on the bight portion 18 may be positively released, as shown in Fig. 3, or may be held in positive engagement with the wheel 17 locking the spool by pressing the arm 21 upwards with the thumb or finger.

In casting out the line, as the forward end of the rod is thrown backwards, the U-shaped locking member is automatically released from the ratchet, and as the line runs outward, it supports the bight or lateral portion of the pawl member retaining it in unlocked position as long as the line continues its outward flight, when however, the hook and end of the line reach the water the line slackens permitting the pawl to drop downwards and engage the ratchet wheel whereby the spool is locked preventing any unnecessary releasing of the line and consequent entangling and back-lashing thereof. If it is desired to release the pawl from the ratchet, it is only necessary to press down the arm 21, and if it is desired to retain the pawl locked on the ratchet, it is merely necessary to press upwards on said arm. The positive lock provided by this means is more effective than the usual lock 16 provided on the reels heretofore.

While I have illustrated and described the preferred form of construction for carrying my invention into effect, this is capable of variation and modification without departing from the spirit of the invention. I therefore, do not wish to be limited to the precise details of the construction set forth, but desire to avail myself of such variations and modifications as come within the scope of the appended claims.

Having described my invention, what I claim as new and desire to secure by Letters Patent, is:

1. A fishing line reel comprising a frame; a spool rotatably mounted on said frame and provided with a line; ratchet means rigidly attached to one side flange of said spool; means pivotally mounted on said frame comprising a U-shaped bar engaging said line and carrying a pawl adapted to engage said ratchet; said bar being automatically raised and said pawl disengaged from said ratchet by said line while taut.

2. A fishing line reel comprising a frame; a spool rotatably mounted on said frame and provided with a line; ratchet means rigidly attached to one side flange of said spool; means pivotally mounted on said frame, comprising a U-shaped bar engaging said line; and a pawl rigidly mounted on the bight of said bar adapted to engage said ratchet, said bar being automatically raised and said pawl disengaged from said ratchet by said line while taut.

3. A fishing line reel comprising a frame; a spool mounted on said frame; a ratchet mounted on said spool, a pawl mounted on said frame co-operating with said ratchet; and an arm rigidly mounted on the pawl and extending from said frame for engagement by a finger whereby said pawl may be retained in positive engagement with the ratchet or may be held positively released therefrom.

4. A fishing line reel comprising a frame; a spool rotatably mounted on said frame and provided with a line; ratchet means rigidly attached to one side of said spool; a U-shaped bar pivotally mounted on said frame, its bight engaging said line; a pawl fastened to the bight of said bar automatically engaging said ratchet when the line is slack; and a member mounted on said bar and engaged by the finger for retaining said pawl either positively engaged with, or positively released from said ratchet.

5. A fishing line reel comprising a frame; a spool mounted within said frame; a ratchet fixed to one side of said spool, within said frame; a U-shaped bar pivotally mounted on said frame for engaging said ratchet; and a member extending from the end of said bar, said member being operable by a finger to positively hold said pawl released from the ratchet or to retain said pawl in positive engagement with the ratchet and prevent rotation of said spool.

In testimony whereof I have signed my name to this specification in the presence of two subscribing witnesses.

CHARLES HERTENSTEIN.

Witnesses:
JOSHUA R. H. POTTS,
FREDA C. APPLETON.